(12) United States Patent
Tanaka et al.

(10) Patent No.: US 7,576,877 B2
(45) Date of Patent: Aug. 18, 2009

(54) APPARATUS, APPARATUS SYSTEM, IMAGE FORMING APPARATUS, AND CONTROL METHOD AND COMPUTER PROGRAMS OF APPARATUS

(75) Inventors: Kazuyoshi Tanaka, Hachioji (JP); Koji Kita, Machida (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 509 days.

(21) Appl. No.: 11/388,320

(22) Filed: Mar. 24, 2006

(65) Prior Publication Data
US 2006/0293765 A1 Dec. 28, 2006

(30) Foreign Application Priority Data
Jun. 27, 2005 (JP) .............................. 2005-186435

(51) Int. Cl.
*G06K 15/00* (2006.01)
(52) U.S. Cl. .................... 358/1.14; 358/1.1; 358/1.15; 399/8; 399/9; 399/81
(58) Field of Classification Search ................ 358/1.14, 358/1.15; 399/8, 9, 10, 11, 81
See application file for complete search history.

(56) References Cited

U.S. PATENT DOCUMENTS

| 6,590,584 | B1 | 7/2003 | Yamaura et al. |
| 7,408,658 | B2 * | 8/2008 | Twede ................. 358/1.15 |
| 2002/0101599 | A1 | 8/2002 | Okimoto et al. |
| 2003/0103232 | A1 * | 6/2003 | Twede ................. 358/1.15 |
| 2004/0080546 | A1 | 4/2004 | Fritz |
| 2006/0028690 | A1 | 2/2006 | Kunori |

FOREIGN PATENT DOCUMENTS

| EP | 1 624 666 A1 | 2/2006 |
| JP | 05-122424 | 5/1993 |
| JP | 06-326797 | 11/1994 |
| JP | 3042655 B2 | 3/2000 |
| JP | 3327566 B2 | 7/2002 |

* cited by examiner

*Primary Examiner*—Kimberly A Williams
(74) *Attorney, Agent, or Firm*—Frishauf, Holtz, Goodman & Chick, P.C.

(57) ABSTRACT

Disclosed is an apparatus having a controller which reproduces operation procedure information received from an operation terminal as an external apparatus, the operation procedure information including a series of operation information as a time-series procedure, and the controller sequentially accepts various settings according to the series of operation information.

15 Claims, 12 Drawing Sheets

- 180 — key STOP
- 181 — checkPanel 0x1000
- 182 — pushPanel 352 98
- 183 — checkPanel 0x1400
- 184 — pushPanel 380 284
- checkPanel 0x1410
- pushPanel 115 146
- checkPanel 0x1500
- pushPanel 153 198
- checkPanel 0x1500
- pushPanel 384 204
- checkPanel 0x1500
- pushPanel 386 279
- checkPanel 0x1410
- pushPanel 386 279
- checkPanel 0x1400
- pushPanel 386 279
- 185 — key 1
- 186 — key 2
- 187 — key 3
- 190 — key START

FIG. 12 (a)

```
180 — key STOP
182 — pushPanel 352 98
184 — pushPanel 380 284
       pushPanel 115 146
       pushPanel 153 198
       pushPanel 384 204
       pushPanel 386 279
       pushPanel 386 279
       pushPanel 386 279
185 — key 1
186 — key 2
187 — key 3
188 — key START
```

```
189 — Label B
180 — key STOP
181 — checkPanel 0x1000
182 — pushPanel 352 98
183 — checkPanel 0x1400
184 — pushPanel 380 284
       checkPanel 0x1410
       pushPanel 115 146
       checkPanel 0x1500
       pushPanel 153 198
       checkPanel 0x1500
       pushPanel 384 204
       checkPanel 0x1500
       pushPanel 386 279
       checkPanel 0x1410
       pushPanel 386 279
       checkPanel 0x1400
       pushPanel 386 279
185 — key 1
186 — key 2
187 — key 3
190 — checkPanel 0x1000
191 — IF A B checkPanel 0x1001
192 — Label A
193 — pushPanel 140 211
188 — key START
194 — LOOP
```

176b

APPARATUS, APPARATUS SYSTEM, IMAGE FORMING APPARATUS, AND CONTROL METHOD AND COMPUTER PROGRAMS OF APPARATUS

CROSS REFERENCE TO RELATED APPLICATION

The present application is based on Japanese Patent Application No. 2005-186435 filed with Japan Patent Office on Jun. 27, 2005.

BACKGROUND OF THE INVENTION

1. Field of the Invention

The present invention relates to an apparatus, an apparatus system, an image forming apparatus and control method and computer programs of the apparatus.

2. Description of Related Art

Various technologies for improving user's convenience and operability have been developed in a field of image forming apparatuses, which is deemed as an object of control, such as copiers, facsimiles and printers. As a typical example, an operation panel, into which a display apparatus and a touch panel are uniformly integrated, has been put in practical use in the field of image forming apparatus. When a user changes setting of optical density or contrast of images, which will be applied when an image is formed by operating a touch panel or operation keys, the setting controls the hardware processing and the software processing of the image forming apparatus based on the direction of the setting. Then, an image based on the setting is formed on a recording medium and outputted.

Also, a system capable of remotely controlling an image forming apparatus through a network has been developed. Specifically, Japanese Patent No. 3042655, for example, discloses a remote control system for controlling the operation of the image forming apparatus by transmitting commands corresponding to the operation keys displayed on a workstation, which are operated through a mouse cursor, to an operation section of the image forming apparatus. Japanese Patent No. 3327566 discloses a system understanding and performing the operation of a computer based on the location of coordinate clicked on a computer screen, which the computer sends to a copier.

In recent years, multifunctional image forming apparatuses have been developed. These image forming apparatuses have a page insert function for inserting a pre-memorized image between pages or a stamp function for superimposing a mark such as "CONFIDENTIAL" or "URGENT" on an image and forming the image. These functions, in general, include many setting items. The user has to execute a series of setting operations to complete an image forming work. Because of this reason described above, when forming an image based on the same setting, the user has to repeatedly execute the same series of setting operation. It is troublesome for the user. When the user happens to forget the series of setting operation, there was a case that the user was not able to form an image based on the same setting operation. Even though other users and technical support members located in a remote area can execute the setting operation by applying remote control technologies, the other users or the technical support members have to repeatedly execute the same setting operation every time when it is needed.

In the scene where investigating the cause of the system abnormality, in order to reproduce the abnormal operation of the image forming apparatus, there is a case that the image forming operation has to be repeated by changing the setting every time. In this situation, it is troublesome and unrealistic for the user to operate the image forming apparatus to trace the operations. This problem associated with the operability of an image forming apparatus occurs even in systems having advantage that the system can be remotely controlled, which Japanese Patent No. 3042655 and Japanese Patent No. 3327566 disclose.

SUMMARY

An object of the present invention is to reproduce or trace the series-of operations applied to an image forming apparatus as a control object and improve the operability of an apparatus to solve the problems described above.

An apparatus according to one embodiment reflecting one aspect of the present invention to achieve the above described object comprises a controller reproducing operation procedure information received from an operation terminal as an external apparatus, the operation procedure information including a series of operation information as a time-series procedure, and sequentially accepts various settings according to the series of operation information.

An apparatus system according to one embodiment reflecting another aspect of the present invention comprises: an operation terminal including a first operation section which receives an input from a user, and generates operation information according to the input; and an apparatus connected to the operation terminal, the apparatus including a controller, which reproduces operation procedure information including, as a time-series procedure, a series of operation information generated by the first operation section of the operation terminal, and sequentially accepts various settings according to the series of operation information.

BRIEF DESCRIPTION OF THE DRAWING

These and other objects, advantages and features of the invention will become apparent from the following description thereof taken in conjunction with the accompanying drawings in which:

FIG. 4 illustrates an example of a data configuration of script data;

FIGS. 12(a)-12(b) illustrate an example of a data configuration of script data in a modified example.

DETAILED DESCRIPTION OF THE PREFERRED EMBODIMENTS

[General Description of a Remote Control System]

An image forming apparatus as a preferable embodiment of an apparatus and a remote control operation system 1 having a remote terminal suitable for an operation terminal to which the present invention is applied will be described below by referring to FIGS. 1-10(b). In this embodiment, a copier will be explained as an example of the image forming apparatus. However, the embodiment of the image forming apparatus is not limited to this example. The present invention will be able to appropriately be applied to an apparatus for forming an image on a recording medium, which may be a facsimile machine and a printer.

Figure 1:
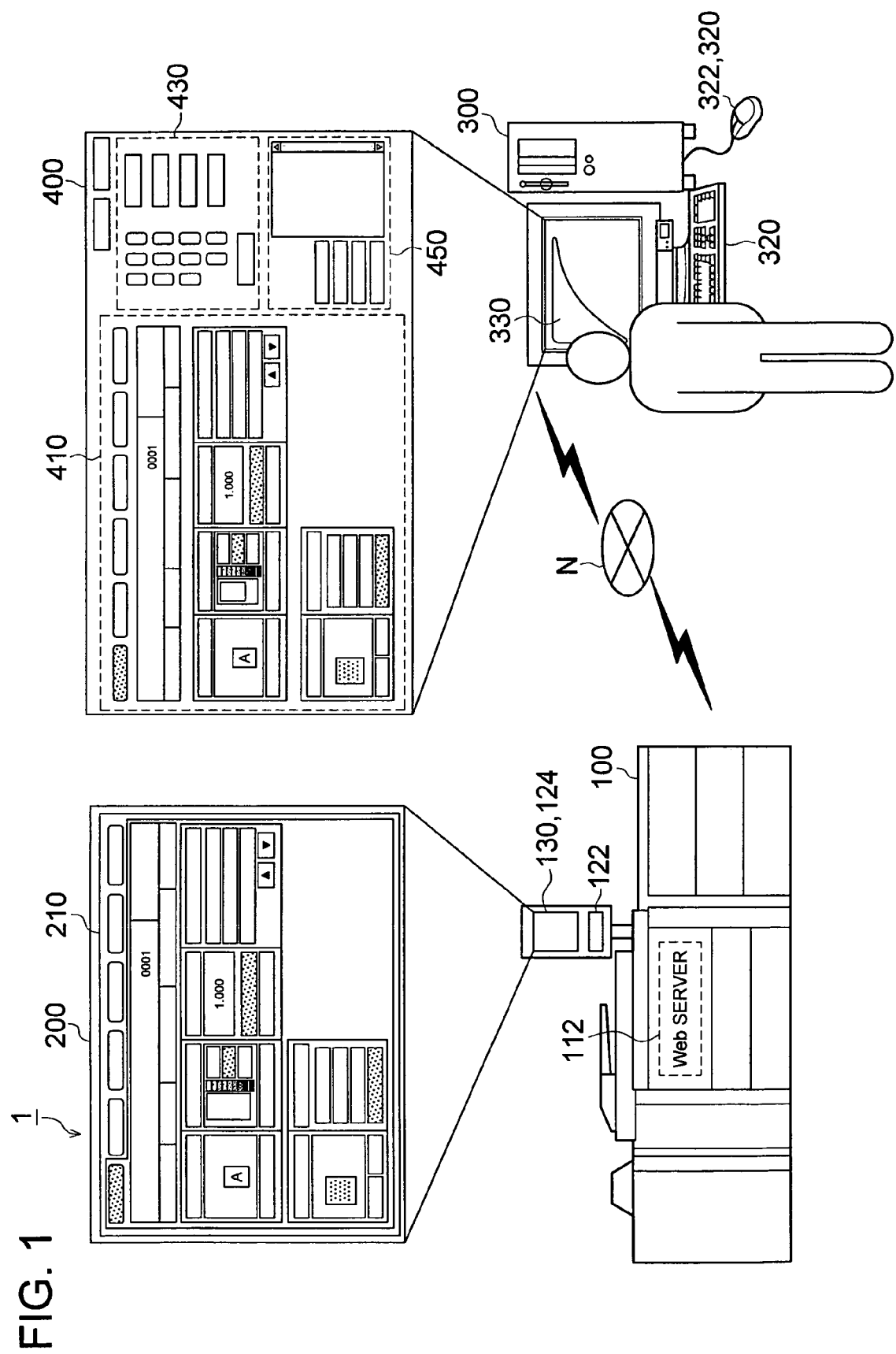
FIG. 1 illustrates a block diagram of a remote control operation system.

FIG. 1 illustrates an example of the block diagram of a remote control operation system 1. According to FIG. 1, a copier 100 and a remote terminal 300 are connected through a communication network N, which may be a wired network or a radio communication network, so that the copier 100 and the remote terminal 300 can communicated each other in the remote control operation system 1. As shown in FIG. 1, the copier 100 includes a display section 130 having a touch panel thereon and a hard key 122. A user changes various settings of the copier 100 and gives the direction for starting a copy function by pushing down the hard key 120 and touching the touch panel 124. The display section 130 is arranged to display the screen of a main operation panel screen 210, which sets various settings of the copier 100 and a main operation screen 200 including a section indicating operation status of the remote control operation system 1.

The copier 100 has a function as a web-server 112. The copier 100 is arranged so that the web-server 112 can be accessed from outside when the copier 100 is connected to the communication network N based on communication protocols such as TCP/IP. The web-server 112 is arranged to transmit a remote operation screen data 174 (refer to FIG. 3) responding to a request from the remote terminal accessing to copier 100 and to display a remote operation screen 400 including the same screen as the main operation panel screen 210.

A remote terminal 300 is a client terminal apparatus for remotely controlling the operation of the copier 100. The remote control terminal 300 is configured by a personal computer or a PDA (personal digital assistance). As shown in FIG. 1, the remote terminal 300 includes a keyboard, an operation section 320 having a mouse 322 therein and a display section 330. The remote terminal 300 has a function as a web-browser. When the remote terminal 300 is connected to the communication network N by using communication protocols such as TCP/PI, as shown in FIG. 2, the remote terminal 300 displays a remote operation screen 400 on a display section 330 based on remote operation screen data 174 transmitted from the copier 100.

Figure 2:
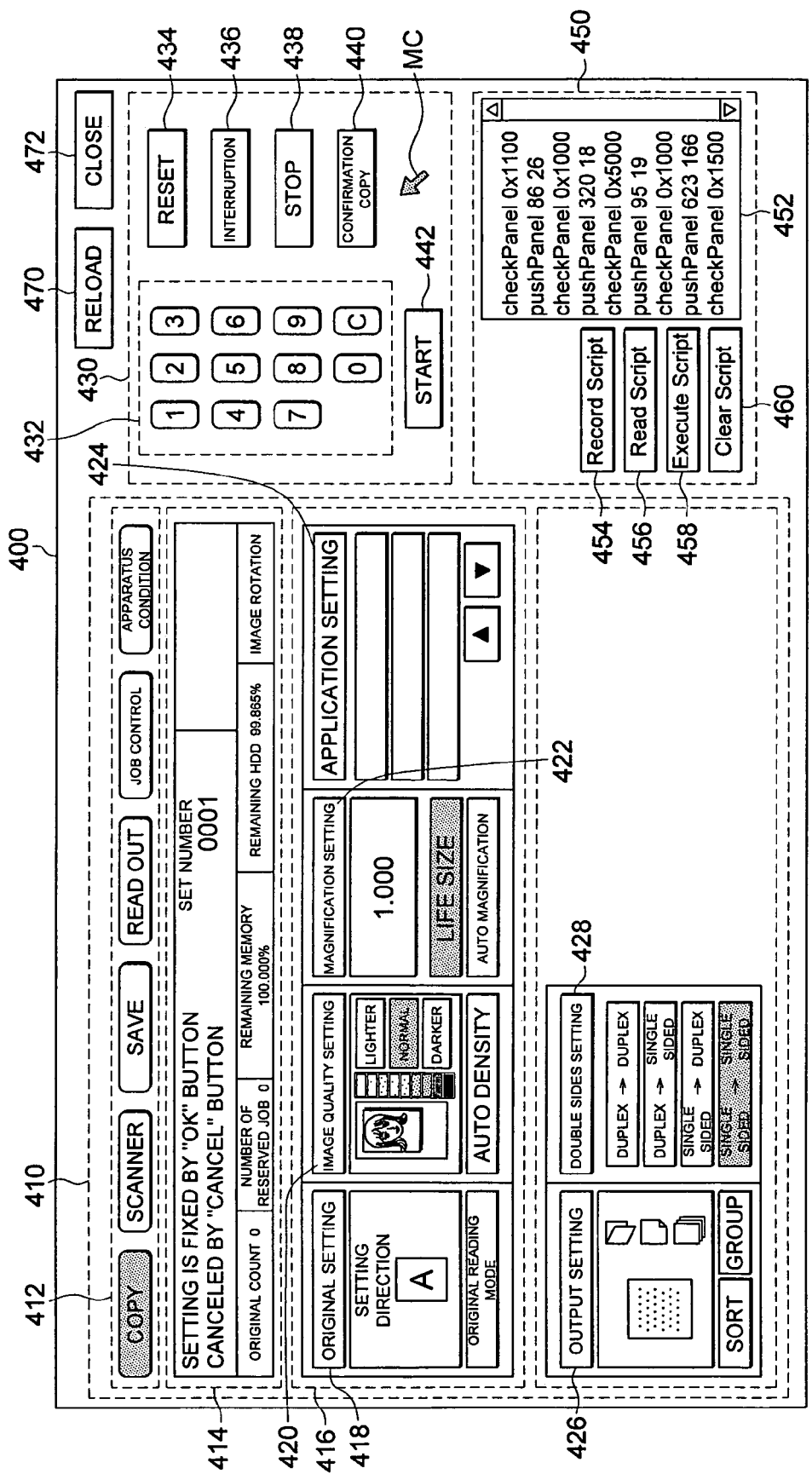
FIG. 2 illustrates an example of a screen for remote control.

As shown in FIG. 2, the remote operation screen 400 includes a remote setting panel 410, a hard key panel 430 and a script panel 450. The remote panel 410 displays the same contents as the contents of the main operation panel screen 210 displayed on the copier 100. The remote operation panel 410 contains tab-buttons 412, an operation status display area 414 and a setting area 416 for setting various items. The tab-buttons 412 are buttons for switching the display of setting items classified based on the functions. The operation status display area 414 is an area for displaying the operation status of the work under execution in the copier 100 and the current usage status. The setting area 416 is an area for setting the item of the function switched by the tab-buttons 412.

In FIG. 2, when a copy function is selected in the tab-buttons 412, the setting area 416 displays document setting buttons 418 for setting the direction of the image which will be scanned, image quality setting buttons 420 for setting a copy density, magnification setting buttons 422 for setting a magnification ratio, application setting buttons 424 for setting an application function, output setting buttons 426 for setting the post-processing of the recording paper sheets such as stapling process or sorting process and double side setting buttons 428 for setting dual face output. When a mouse cursor MC is moved onto each setting button and the user clicks a mouse 322, a setting panel corresponding to each item is displayed in a window style. The user can execute the detail settings on the setting panel.

A hard key panel 430 is a button group being a copy of the hard key 122 of the copier 100. The hard key panel 430 comprises numeric buttons 436, a reset button 434 for resetting the items which have been set, an interrupt button 436 for executing interrupt processing while copying, a stop button 438 for stopping copy operation, copy confirmation button 440 for confirming the copy operation and a start button 442 for starting the copy operation.

When starting copy operation, the user touches various buttons on the main operation panel screen 210 of the copier 100 to set necessary items, then starts copy operation or can reset settings by pushing down the hard key 122. Meanwhile, a user located at the remote terminal 300 can remotely control the copier 100 through the remote terminal 300. The user can clicks various buttons on the remote setting panel 410 and the hard key panel 430 of the remote terminal 300 to execute the same operations which can be executed by the touching the main operation panel screen 210 and pushing down operation of the hard key 122 of the copier 100.

When clicking the mouse 322 on the remote operation screen 400, the copier 100 is arranged to record the operation information of the procedure. The recorded and stored operation information will be called script data 176 in this embodiment. The user can trace various settings by reproducing the series of the operations which user has set once.

A script panel 450 is an operation panel for controlling the script data 176. The script panel 450 comprises a script display area 452 for displaying the contents of the script data 176, a record button 454, a read button 456, an execute script button 458 and a clear button 460.

The user clicks the remote setting panel 410 and the hard key panel 430 to set various settings. The copier 100 successively records the operation information and the operation information is displayed on a script display area 452 every time when clicking operation is executed. When the user clicks a start button 442, the recording operation of the script data 176 is finished and a storage section 170 of the copier 100 stores the script data 176, which has been completed. Then, a controller 110 reads out the script data 176 stored in the copier 100 when the user clicks the read button 456. When the user clicks the execute script button 458, the controller 110 reproduces the series of operations which the user has executed based on the read script data 176 and trances the various settings obtained by the series of operations. The clear button 460 is a button for deleting the script data 176 which are currently stored in the copier 100.

A reload button 470 and a close button 472 are displayed in the right-upper portion of the remote operation panel 400. When the user clicks the reload button 470, the remote terminal 300 issues a transmission request of updated remote operation screen data 174 to the copier 100 and refreshes or updates the display contents of the remote operation screen 400. The close button 472 is a button for closing the remote operation screen 400.

[A Remote Terminal Configuration]

Figure 3:
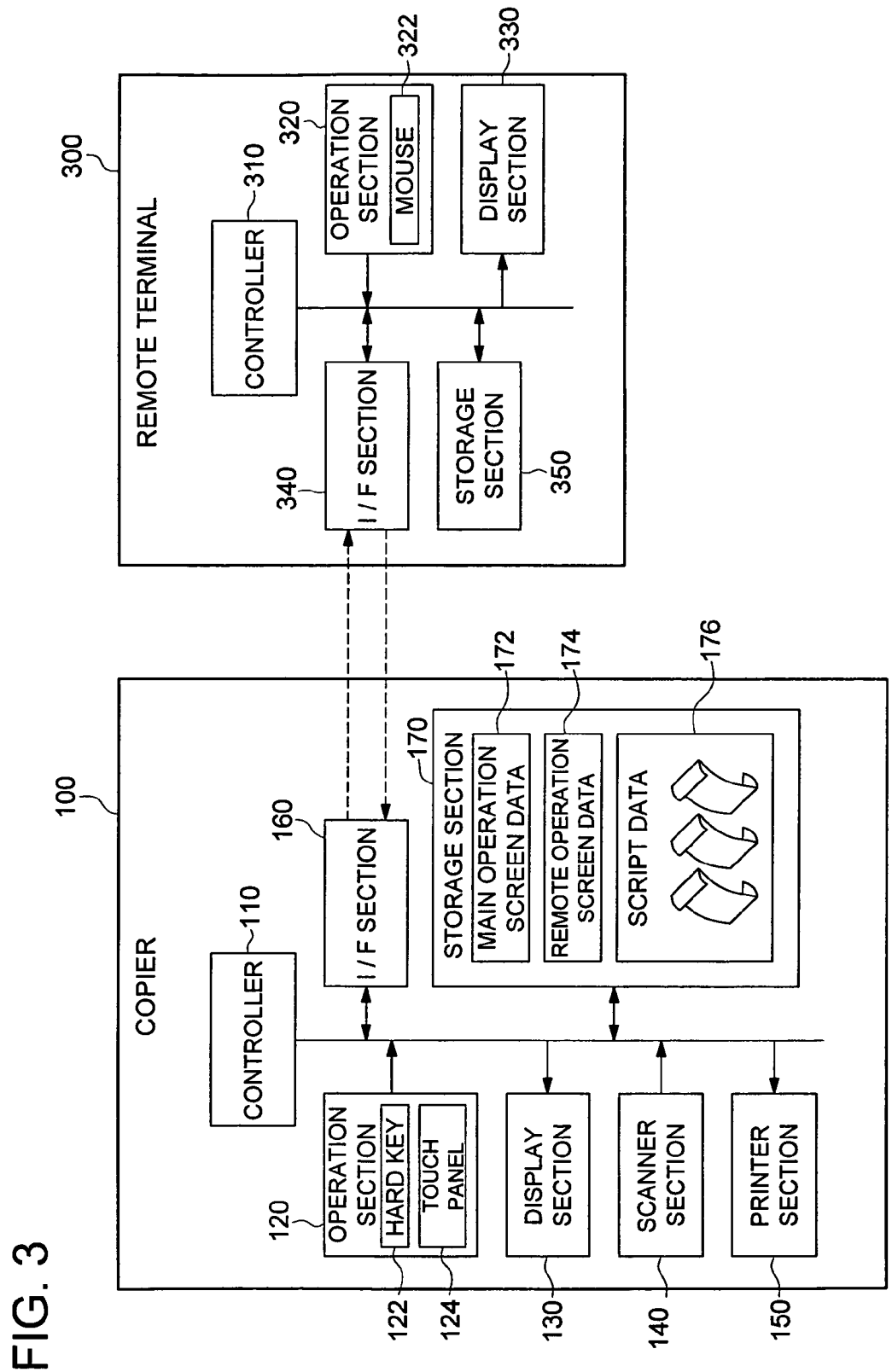
FIG. 3 illustrates an example of a functional configuration of the remote control operation system.

FIG. 3 illustrates an example of a block diagram of the remote control operation system 1. The functional configuration of the remote terminal 300 will be described below. As shown in FIG. 3, the remote terminal 300 comprises a controller 310, an operation section 320, a display section 330, an I/F section 340 and a storage section 350.

The controller 310 is a function section for totally controlling the remote terminal 300 by executing the processes based on predetermined programs under the inputted directions and controlling input and output from or to each function section. The controller 310 comprises a CPU (Central Processing Unit), a ROM (Read Only Memory) and a RAM (Random Access Memory). Specifically, the CPU reads out a program stored in the ROM and or the storage section 350 according to operation signals inputted from the operation section 320, and displays the processing results based on the programs on to the display section 330.

The operation section 320 comprises a cursor, a keyboard having a ten-key and various function keys and a pointing device such as a mouse 322. The operation section 320 outputs signals created when a key is pressed down and position signals of the mouse 322 to the controller 310.

The display section 330 comprises a CRT (Cathode-ray Tube) and a LCD (Liquid Crystal Display) and displays various screens based on graphic data inputted from the controller 310. The I/F section 340 is a function section for communicating data through the communication network N. The I/F section 340 comprises a modem, LAN interface and USB.

The storage section 350 is a function section for recording and or reading data to or from a storage medium such as, for example, CD-ROM, a memory card and a hard disc. The storage medium comprises a magnetic medium, an optical storage medium or semiconductor memory, which store data processed by application programs and various processing programs.

The controller 310 works as a Web-browser and displays the remote operation screen 400 on the display section 330. The controller 310 obtains an x-coordinate and a y-coordinate of the mouse cursor MC on the remote operation screen 400 based on the positioning signals outputted from the operation section 320. Further the controller 310 transmits the obtained coordinate data to the copier 100 through the I/F section 340 and issue request of the remote operation screen data 174. When receiving the remote operation screen data 174 from the copier 100, the controller 310 refreshes the remote operation screen 400 based on the remote operation screen data 174. Based on these operations, the remote terminal 300 displays the remote operation screen 400 based on the remote operation screen data 174 transmitted from the Web-server 112.

[Copier Configuration]

Functional configurations of the copier 100 will be described below. As shown in FIG. 3, the copier 100 comprises a controller 110, an operation section 120, a display section 130, a scanner section 140, a printer section 150, an I/F section 160 and a storage section 170.

The controller 110 executes processing based on the predetermined programs corresponding to signals inputted from the operation section 120. The controller 110 is a function section for totally controls the copier 100 by inputting and outputting commands and data from or to each function section. The controller 110 comprises a CPU, a CD-ROM and a RAM.

The operation section 120 includes a hard key 122 having various keys such as a numeric key, a start key and a reset key, and outputs signals obtained when the hard key is pressed down to the controller 110. The operation section 120 includes a touch panel 124 integrally formed into one body with the display section 103. The operation section 120 detects the position on the touch panel 124 where the user touches by his or her fingertip or a touch pen, and transmits the positioning signals to the controller 110.

The display section 130 comprises a CRT and a LCD and a transparent touch panel 124 is superimposed thereon. The display section 130 displays various screens according to commands from the controller 110. Particularly, in this embodiment, the display section 130 displays the main screen 200 based on the main operation screen data 172 stored in the storage section 170. The controller 110 determines which button in the main operation screen 200 does the user touch by comparing the positioning signals indicating the touching position in the touch panel 124 and the main operation screen data 172. This allows the controller 110 to process necessary tasks according to the button, which the user touches, such as, for example, changing the copy settings and updating the main operation screen data 172.

The scanner section 140 is a function section for reading document placed on a document table as image data. Specifically the scanner section 140 carries the document placed on the document table onto a contact glass, and reads the document by irradiating the light beams from a light source to the document and guiding the reflected light beams from the document to a CCD (Charge Coupled Devices) through a mirror unit and a focusing lens.

The printer section 150 is a function section for forming an image on a transfer paper sheet. Laser beams emitted from an expose section scan and scan a photosensitive drum, and form an electro-static latent image based on the image data read by the scanner 140. Then, developing material is absorbed onto the photosensitive drum and the latent image is transferred (copied) onto a recording paper sheet in a developing section. Then, the image is formed by thermally fixing toner onto the recording paper sheet in a fixing section.

The I/F section 160 is a function section for conducting data communication by connecting the copier 100 to the communication network N. The I/F section 160 comprises a modem, LAN interface and a USB.

The storage section 170 is a function section for reading and writing data from or onto a recording medium such as, for example, VRAM (Video RAM), CD-ROM, memory card and a hard disc. The recording medium comprises magnetic storage medium, optical storage medium and/or semiconductor memory, which store application programs, data processed by various processing programs, image data that the scanner section 140 scans and the setting data of copy function that the user has set. Further, as shown in FIG. 3, the storage section 170 stores the main operation screen data 172, the remote operation screen data 174 and the script data 176.

The main operation screen data 172 is image data (for example, HTML format) for displaying the main operation panel screen. 210 and the main operation screen 200 including detailed setting panel. The controller 110 generates and updates the main operation screen data 172 for displaying the main operation screen 200 including the main operation panel 210 on which a detail setting panel for further setting detail settings (for example, an application setting panel P42 being a window style shown in FIG. 7(b)) is superimposed, when the button in the main operation panel 210 is touched or the button on the remote setting panel 410 of the remote terminal 300 is clicked. Panel numbers used for identification are separately assigned to the main operation panel screen 210 and the detail setting panel.

The remote operation screen data 174 is an image data (for example, HTML format) for displaying the remote operation screen 400 onto the remote terminal 300. The controller 110 generates image data for separately displaying the hard key panel 430 and the script panel 450. Further the controller 110 generates the remote operation screen data 174 by connecting and synthesizing the image data, and the main operation screen data 172.

When the remote terminal 300 receives coordinate data, the controller 110 detects the clicked position on the remote operation screen 400 by comparing the remote operation screen data 174 and the coordinate data, which are x-coordinate and y-coordinate. When the controller 110 determines that the position of the button displayed on the remote setting panel 410 is the clicked position, the controller 110 generates and updates the main operation screen data 172 for displaying the detail setting panel corresponding to the button on the main operation panel screen 210. When the controller 110 determines that the position of the button displayed on the hard key panel is the clicked position, the controller 110 determines that the hard key 122 corresponding to the button is pushed down and conducts the processing corresponding to the hard key 122 (for example, copy-start or reset) and generates and updates the main operation screen data 172 for displaying the operation status of process for the processing onto the display area 414.

When the controller 110 updates the main operation screen data 172 corresponding to the user's operations, at the same time, the controller 110 also updates the remote operation screen data 174 based on the main operation screen data 172. Further the controller 110 transmits the remote operation screen data 174 to the remote terminal and allows the remote terminal to updates the screen contents of the remote operation screen 400. Consequently, it is possible that the copier 100 displays the main operation panel screen 210 based on the maim operation screen data 172, while the remote terminal 300 displays the remote operation screen 400 including the remote operation screen 410 being the same as the main operation panel screen 210 based on the remote operation screen data 174.

The script data 176 being operation procedure information is a data table for sequentially recording a series of operation of the user on the remote terminal 300 as operation information. Controller 110 determines whether the hard key panel 430 was clicked or the remote operation panel 410 was clicked based on the coordinate data received from the remote terminal 300 and sequentially memorizes the determination results in a format of operation information called "command argument" in accumulation. FIG. 4 illustrates an example of a data configuration of script data.

For example, operation information 180 indicates that a stop key in the hard key 122 was pressed down (a stop button 438 was clicked) and operation information 181 indicates that an operation panel having panel number "0x1000" of the operation panel was clicked, when it is shown in the most upper layer. In this case, "check Panel" functions as a command for checking the panel number located in the most upper layer panel displayed based on the main operation screen data 172. Operation information 182 indicates that the main operation panel screen 210 located in the position having x-coordinate "352" and y-coordinate "98" was touched (the remote setting panel 410 was clicked).

The controller 110 sequentially reads out the operation information stored in the script data 176 and conducts the processing corresponding to the operation indicated by the operation information. Accordingly, it becomes possible to reproduce a series of user's operation stored in the script data 176 and reproduce the copy condition, which the user previously has set.

[Actual Operation of a Remote Operation System]

Figure 5:
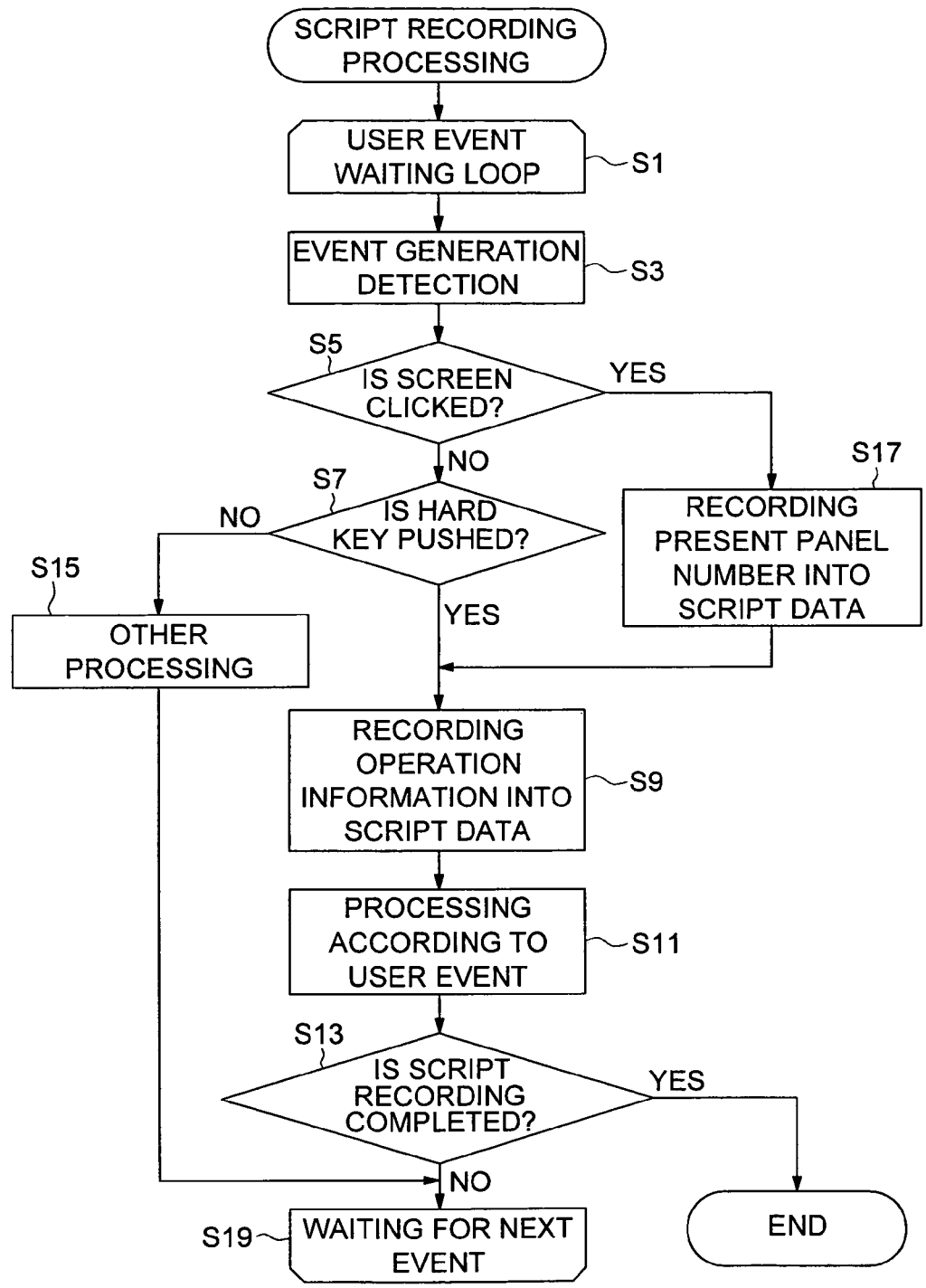
FIG. 5 illustrates a flowchart for explaining a script memory processing.
Figure 6:
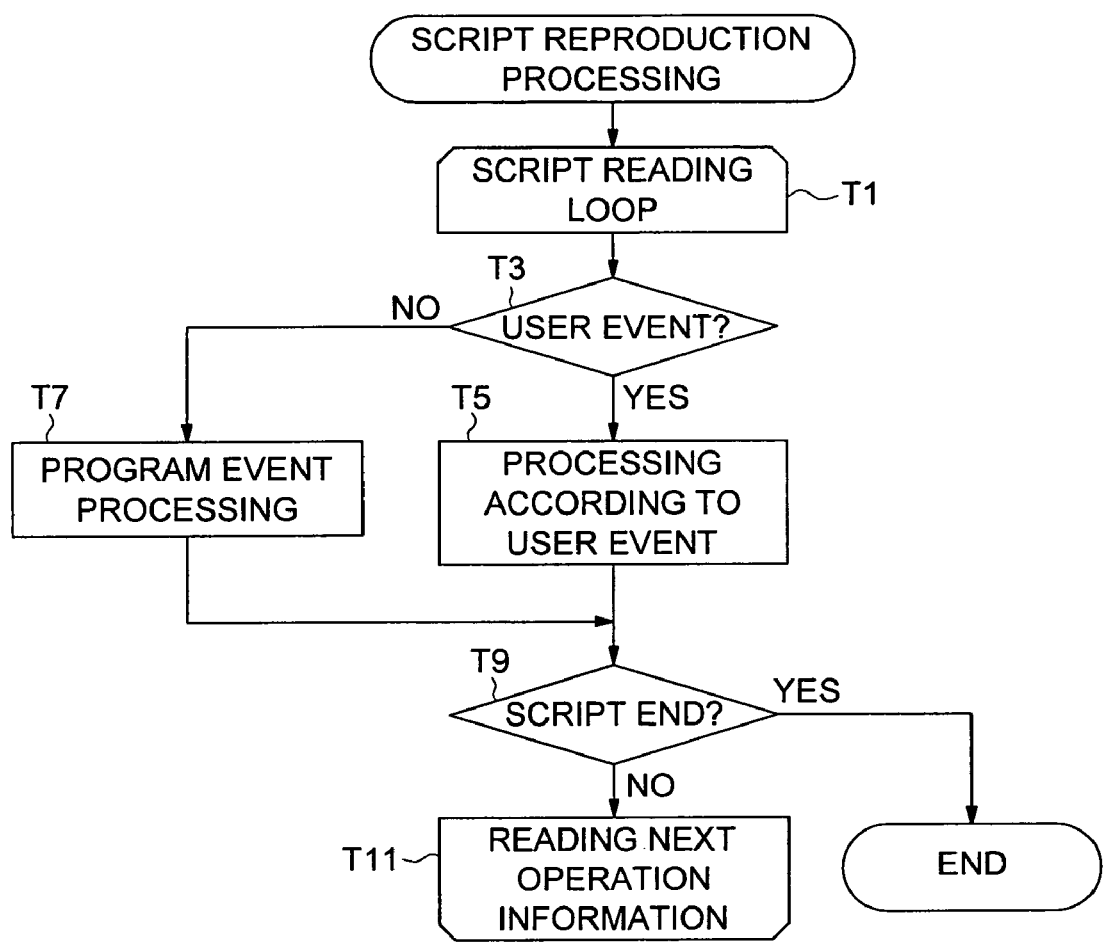
FIG. 6 illustrates a flowchart for explaining a script reproduction processing.

Actual operation of a remote operation system 1 will be described below by referring to flowcharts shown in FIGS. 5-6, and FIGS. 7-11. The script recording processing in FIG. 5 is conducted based on a script recording program and a script reproducing process is conducted based on a script reproducing program. These programs described above are stored in a ROM or a storage section 170 in the controller 110, which are not shown in this specification. Since the same contents are displayed and updated in both a main operation panel screen 210 and a remote setting panel 410, only the transition of the remote setting panel 410 will be shown in FIGS. 7-11 and illustration of the main operation panel 210 will be omitted here.

Firstly, the script recording processing will be described below. When the controller 110 of the copier 100 determines that the recording button 454 of a script panel 450 was clicked from coordinate data transmitted from the remote terminal 300, the controller 110 reads out the script-recording program and starts script-recording processing.

The controller 110 waits the occurrence of user-event in a user-event-waiting loop. Here, the user-event means an event caused by user operation which will be the receipt of coordinate data transmitted from the remote terminal 300 by the click of mouse 322.

When the controller 110 detects the occurrence of a user event (step S3), the controller 110 judges the operation conducted by the user at the remote terminal 300. When the controller 110 determines that the operation is click operation on the remote setting panel 410 corresponding to the touch operation on the main operation screen 200 (step S5: Yes), the controller 110 records the panel number of the main operation screen 200, which is currently displayed, into script data 176 (step S17) as the operation information 181 as shown in FIG. 4 and further records the operation information indicating the operation which user has conducted, into the script data 176 (step S9).

When the controller 110 determines that the click operation has not been conducted on the remote setting panel 410 at step S5 (step S5: No), the controller 110 determines whether or not the operation conducted by the user is the click operation of the button on the hard key panel 430 corresponding to the pushing down operation of the hard key 122. When the controller 110 determines that the click operation is the click operation of the hard key panel 430 (step S7: Yes), the controller 110 records the operation information of the operation into the script data 176 (step S9).

After finishing the processing of step S9, the controller 110 identifies the operation conducted by the user from received coordinate data. Then, the controller 110 updates the main operation screen data 172 and the remote operation screen data 174 corresponding to the operation and issues the direction of the operation to each function section, for example, magnification setting, number of copy, copy settings such as document size setting and copy start (step S11). Meanwhile, when the controller determines that the operation is not click operation of hard key panel 430 (step S7: No), the controller 110 executes other processing corresponding to the event and moves to step S17.

When the received coordinate data is the coordinate data on the start button 442, the controller 110 determines whether the script recording has been completed (step 813: Yes) and finishes the script recording processing. It may also possible to determine whether the script recording has completed by proving a record-stop button, for example, on the script panel 450 and determining whether the record-stop button has been clicked. When completing the recording of script data 176, the storage section 170 records the completed script data 176.

When the controller 110 determines that the script recording continues (step S13: No), the controller 110 repeats the process in the waiting loop S1-S19 waiting for next user event (step S19) and records the script data 176 corresponding to the occurrence of user event.

For example, when a user firstly clicks the stop button 438 on the remote terminal 300, the coordinate data of the mouse cursor MC on the stop button 438 is transmitted to the copier 100. The copier 100 detects the user event, determines that the coordinate data is coordinate data on the hard key panel 430, and records the operation data 180 into the script data 176 as shown in FIG. 4.

When the user clicks the application-setting button 424, the coordinate data of the mouse cursor MC is transmitted to the copier 100 and the controller 110 of the copier 100 determines whether the coordinate data is coordinate data on the remote setting panel 410. Then, the controller 110 deems the panel number of the main operation screen data 172 as operation information 181 shown in FIG. 4 and records the received coordinate data into the script data 176 as the operation information 182.

The controller 110 of the copier 100 compares the received coordinate data and the remote operation screen data 174, and determines whether the application button 424 of the remote setting panel 410 corresponding to the touching operation of the application setting button on the main operation panel has been operated. Then, as shown in FIG. 7(b), the controller 110 generates the main operation screen data 172 for superimposing the application setting panel onto the main operation panel screen and updates the remote operation screen data 174. Then, the controller 110 transmits the remote operation screen data 174 to the remote terminal 300 and updates the display screen of the remote terminal 300.

When the user clicks the stamp/overlay button 431 of an application setting panel P42 displayed on the remote terminal side, the controller 110 of the copier 100 records the operation information 183 and 184 into the script data 176 in the same way as the application-setting button 424 is clicked as shown in FIG. 7(a). And at the same time, the stamp/overlay panel P43 is superimposed and displayed as shown in FIG. 8(a) and updated. As described above, every time when a user conducts click-operation with the remote terminal 300, the operation information of the series of user's operation information is sequentially recorded into the script data 176.

The user conducts the setting of the stamp/overlay by clicking a fixed type stamp button 433 of the stamp/overlay panel P43, a copy-prohibited button 435 of a fixed type stamp panel P44 shown in FIG. 8(b) and a right-below button 437 as shown in FIG. 9(a). Then, when closing each detail setting panel by clicking the OK-button 439 of a fixed type stamp panel P44 as shown in FIG. 9(b), the OK-button 411 of the stamp/overlay panel P43 shown in FIG. 10(a) and OK-button 413 of an application setting panel P42 shown in FIG. 10(b), a setting complete button 415 is displayed of FIG. 11 which shows that the stamp/overlay setting has completed. The operation information corresponding to the user-clicking operation is sequentially recorded into script data 176.

When pushing down a numeric button 432 to set the number of paper sheet to be copied and clicking the start button 442, the scanner section 140 and the printer section 150 are driven. Then a stamp "copying is strictly prohibited" is formed into an image together with a copied image and outputted. Clicking this numeric button 432 and the start button 442 stores the operation information 185-188 into the storage section 170 and generates the script data 176 having data structure illustrated in FIG. 4.

Next, script reproducing process will be described. When the controller 110 of the copier 100 determines, for example, the read button 456 of the script panel 450 was clicked and an execute script button 458 was selected from a plurality of script data 176 and clicked from the coordinate data transmitted from the remote terminal 300, the controller 110 reads out the script reproduction program and starts script reproduction processing based on the program.

Firstly, the controller 110 reads out operation information one by one from the top of the script data 176 (step T1) and determines whether the operation information is a user event (step T3) in the read out loop of the script data 176.

The controller 110 determines that the operation information is a user event when a command in the operation information is either "key" or "push Panel" (step T3: Yes) and executes the processing operation (image forming processing) corresponding to the user event (step T5). More specifically, when-the command is "key", the controller 110 executes the same processing operation as the processing operation executed when hard key 122 indicated by the argument is pushed down, and when the command is "push Panel", the controller 110 executes the same processing operation as the processing operation conducted when the button of the main operation panel screen 210 indicated by the argument is clicked.

When the operation information is not a user event (step T3: No), the controller 110 executes program-event process according to the command in the operation information (step T7). Specifically, when the command was "check Panel", the controller 110 checks whether the panel number located at the most upper layer of the main operation screen 200 being under display is the same number of the argument. When it is the same number, the controller 110 proceeds the processing to the next step, and if it is not the same number, the controller 110 forcefully stops the script reproducing process.

The controller 110 determines whether the read operation information is the end of the script data 176 after finishing of process of the steps T5 and T7. If it is not the end of the script data 176 (step T9: No), the controller 110 reads out the next operation information (step 11) and repeats the process of steps T1-T11). If the read operation information is the end to the script data 176 (step T9: Yes), then the controller 110 stops the script reproduction processing.

Setting the time interval between each loop of the steps T1-T11, namely the time interval for reading operation information, for example, one second by adjusting the processing steps of the step 5 allows user to visibly recognize the time interval for the display-update of the main operation screen 200 and the remote operation screen 400. Based on this way, it becomes possible that a user can visibly recognize the series of operations for completing the set items. The time interval between the display-updates of the main operation screen 200 and the remote operation screen 400 may also be changed. In order to improve the visibility of the user to recognize a series of operations, with regard to the script "push Panel", a finger icon may be superimposed on the button of the main operation panel indicated by the argument and the controller 110 may be arranged to conduct the same process after passing one second from the start of the superimposition as the process conducted when the button is touched.

Figure 7:
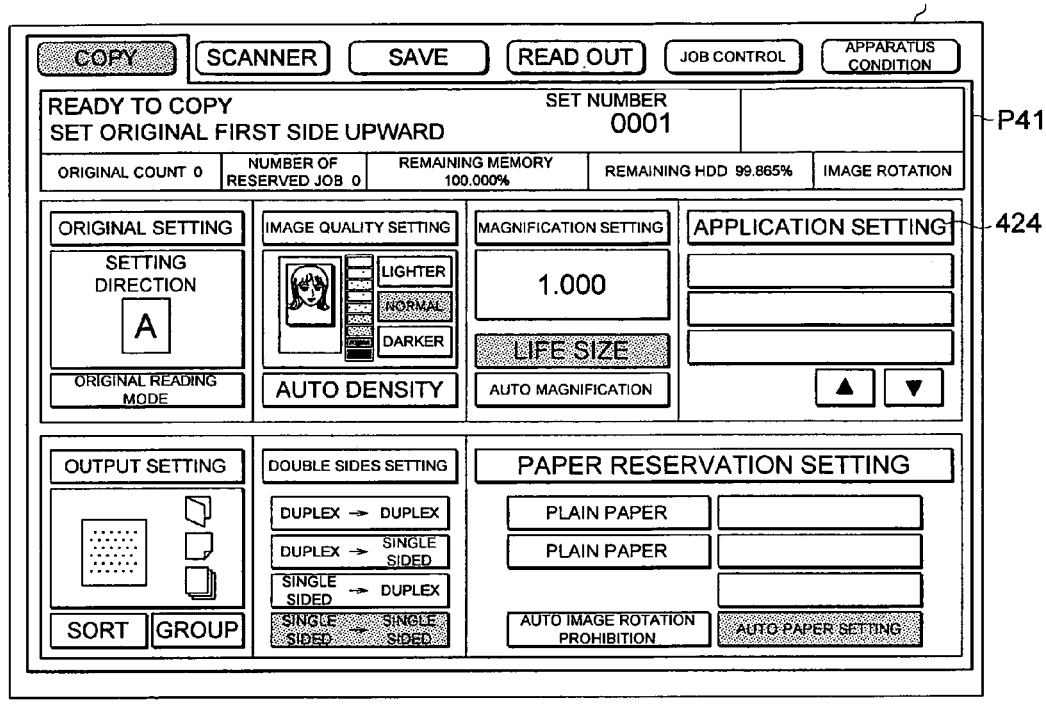
FIGS. 7(a)-7(b) are the first drawings for illustrating a screen transition of a main operation screen and a remote operation screen.
Figure 7:
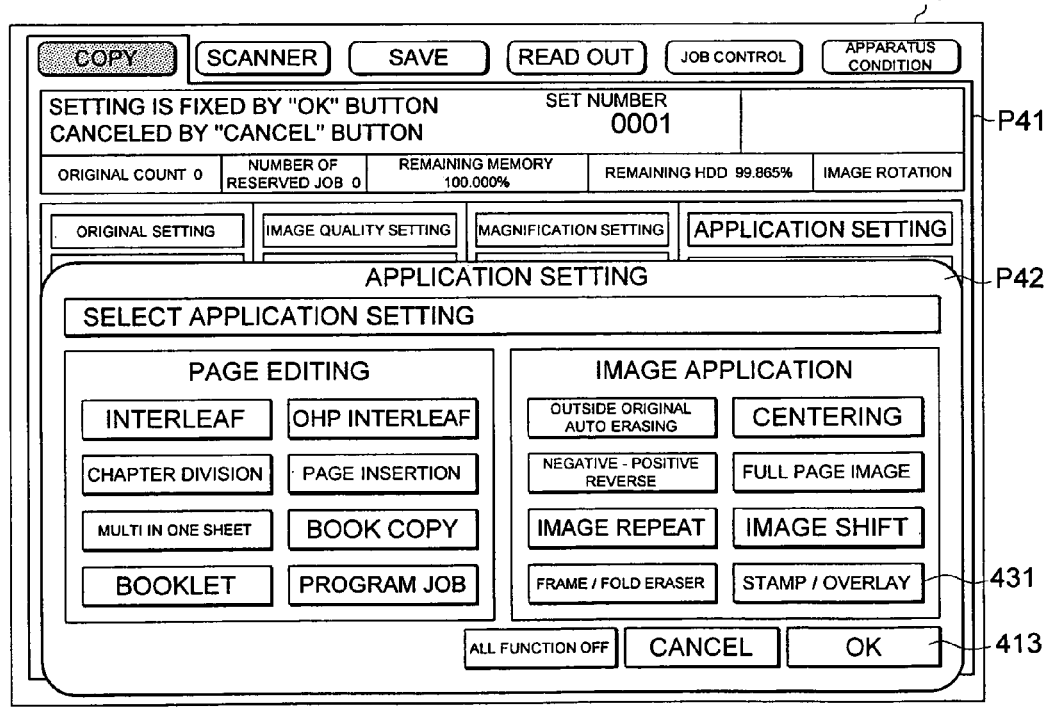

For example, when the user has selected the script data 176 and clicked the execute script button 458, the controller 110 reads out the operation information 180, conducts the same processing operation as the process conducted when the stop key has been pushed down, and updates the main operation screen data 172 and the remote operation screen data 174. Then the copier 100 displays the main operation panel screen 210 as shown in FIG. 7(*a*) and the remote terminal 300 displays the remote setting panel 410.

Then, the controller 110 reads out the next operation information 181 and checks whether the panel number of the main operation panel screen 210 displayed based on the main operation screen data 172 is "0x1000". Based on the next operation information 182, the controller 110 executes the same processing operation as the processing operation conducted when the point having coordinate (352, 98) on the main operation panel screen 210 shown in FIG. 7(*a*), namely the application setting button 424 is touched or clicked. According to the operation described above, the main operation screen 200 in which the application setting panel P42 is superimposed onto the main operation panel screen 210 as illustrated in FIG. 7(*a*) and the remote operation screen 400 respectively are displayed on the copier 100 and the remote terminal 300.

Figure 8:
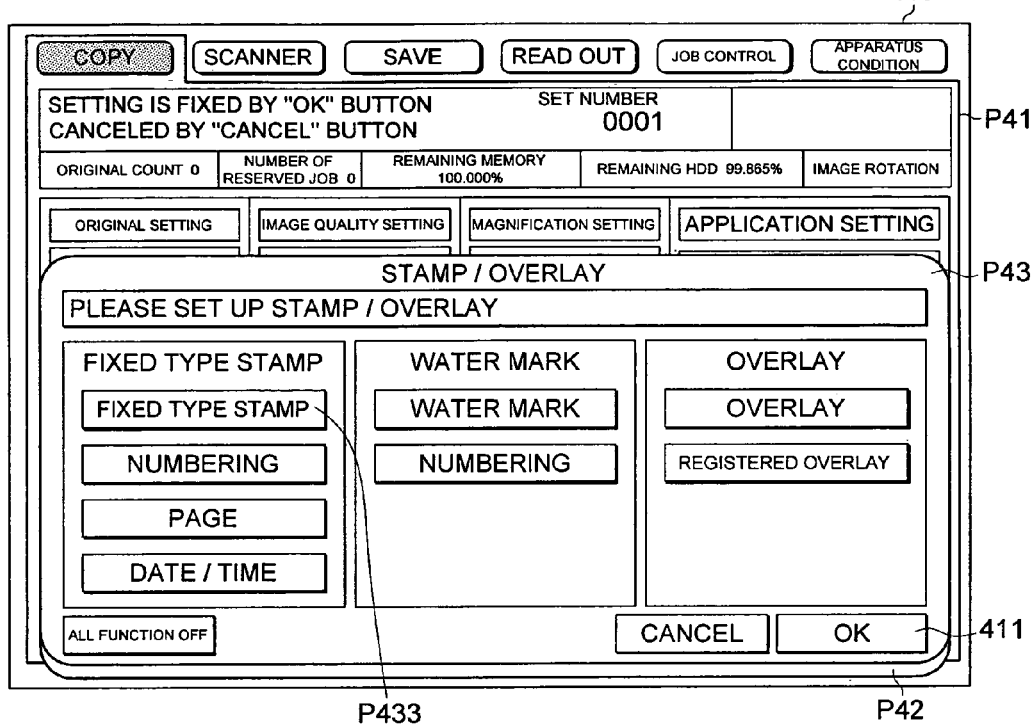
FIGS. 8(a)-8(b) are the second drawings for illustrating a screen transition of a main operation screen and a remote operation screen.
Figure 8:
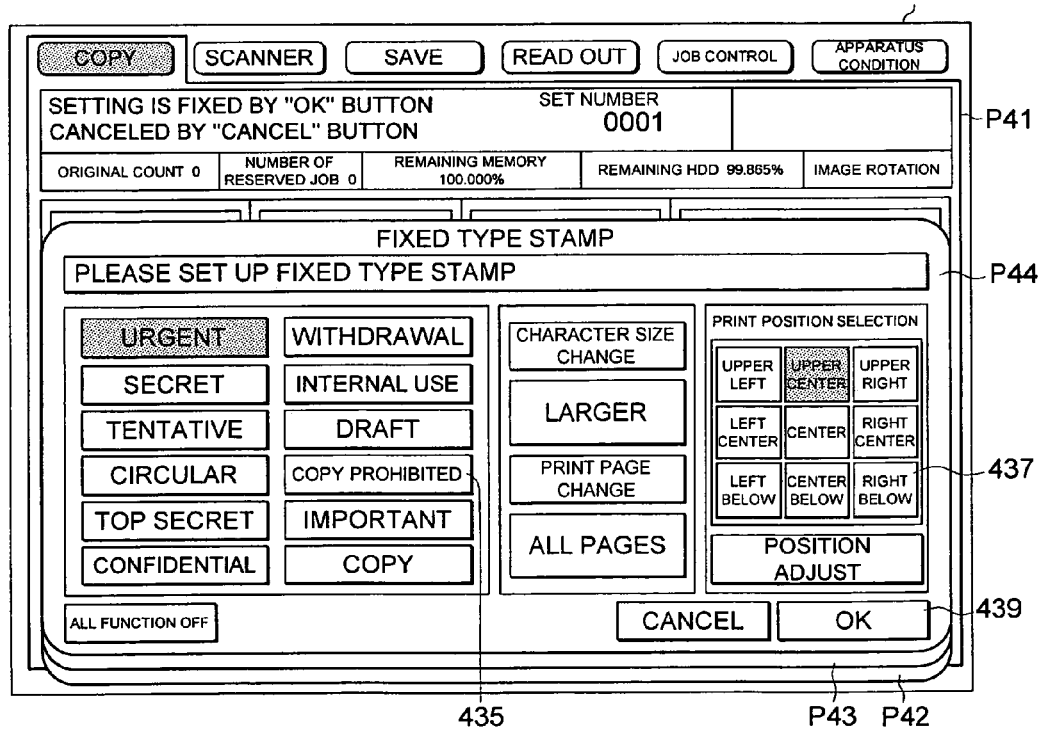
Figure 9:
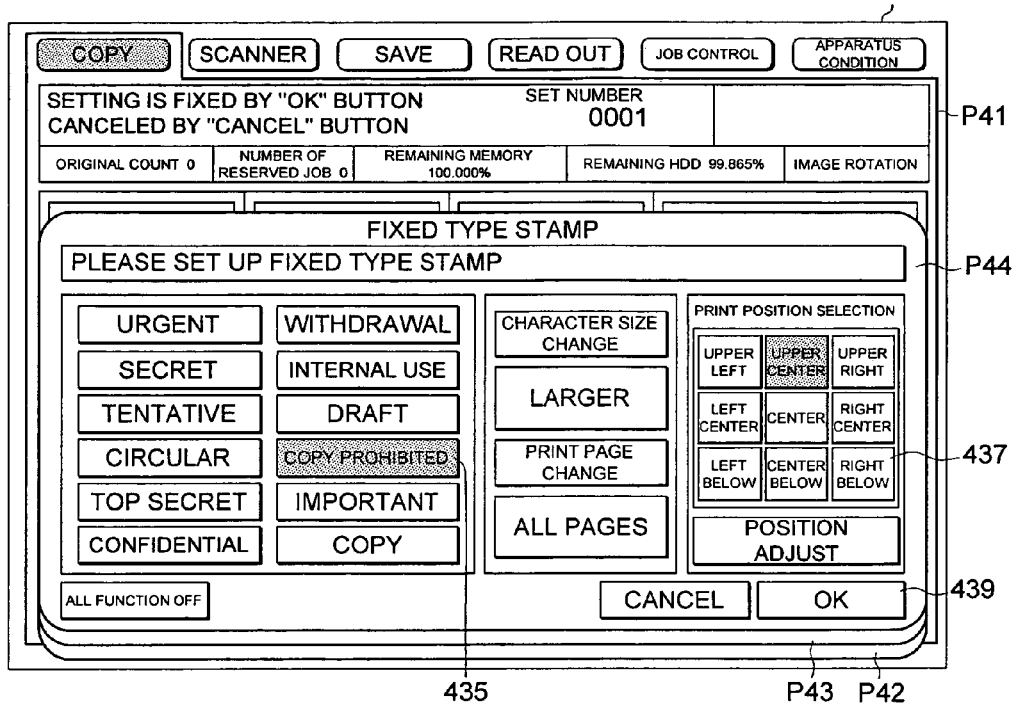
FIGS. 9(a)-9(b) are the third drawings for illustrating a screen transition of a main operation screen and a remote operation screen.
Figure 9:
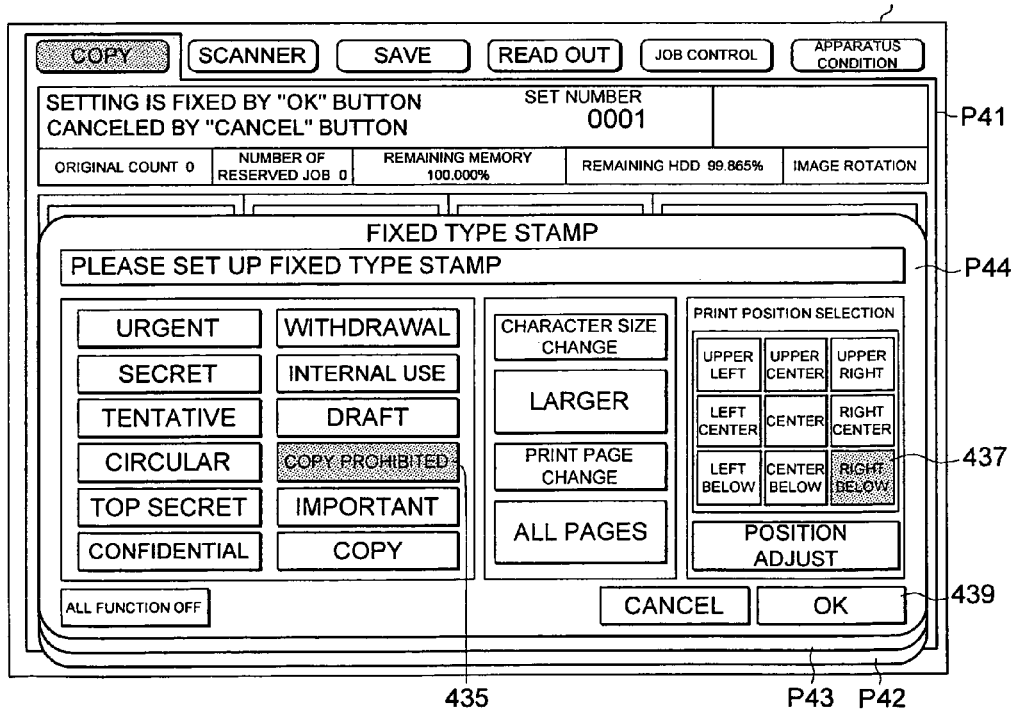
Figure 10:
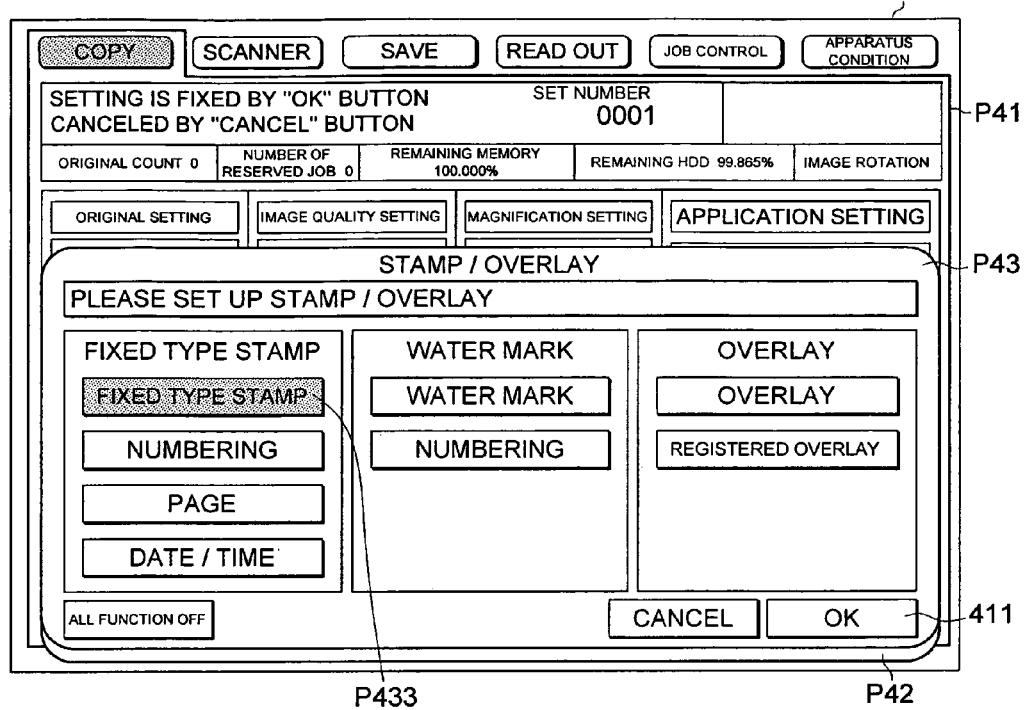
FIGS. 10(a)-10(b) are the fourth drawings for illustrating a screen transition of a main operation screen and a remote operation screen.
Figure 10:
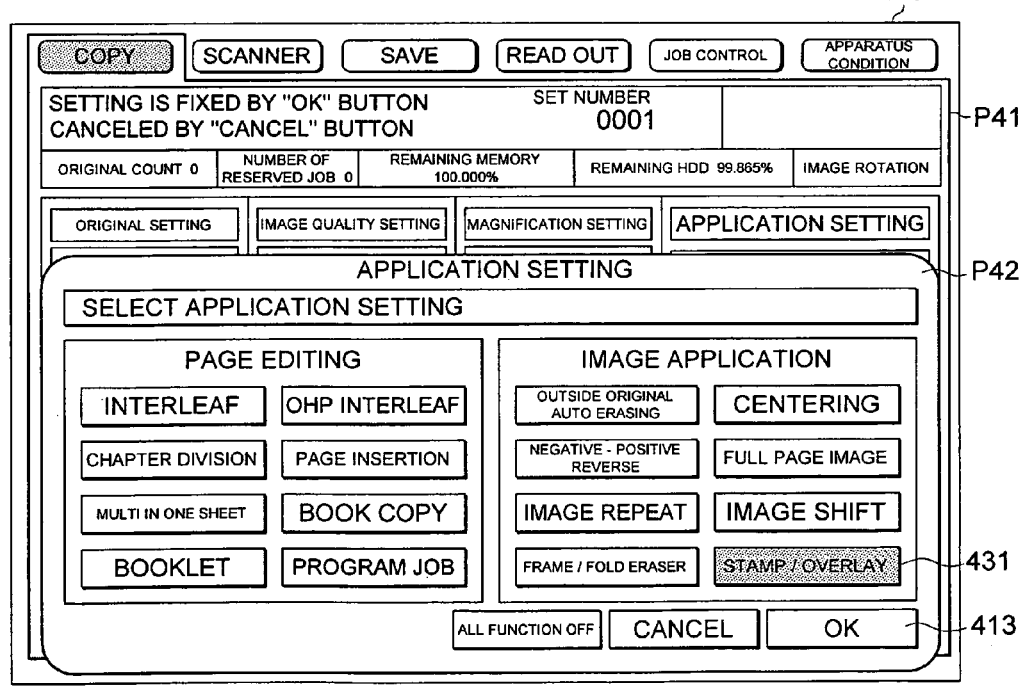
Figure 11:
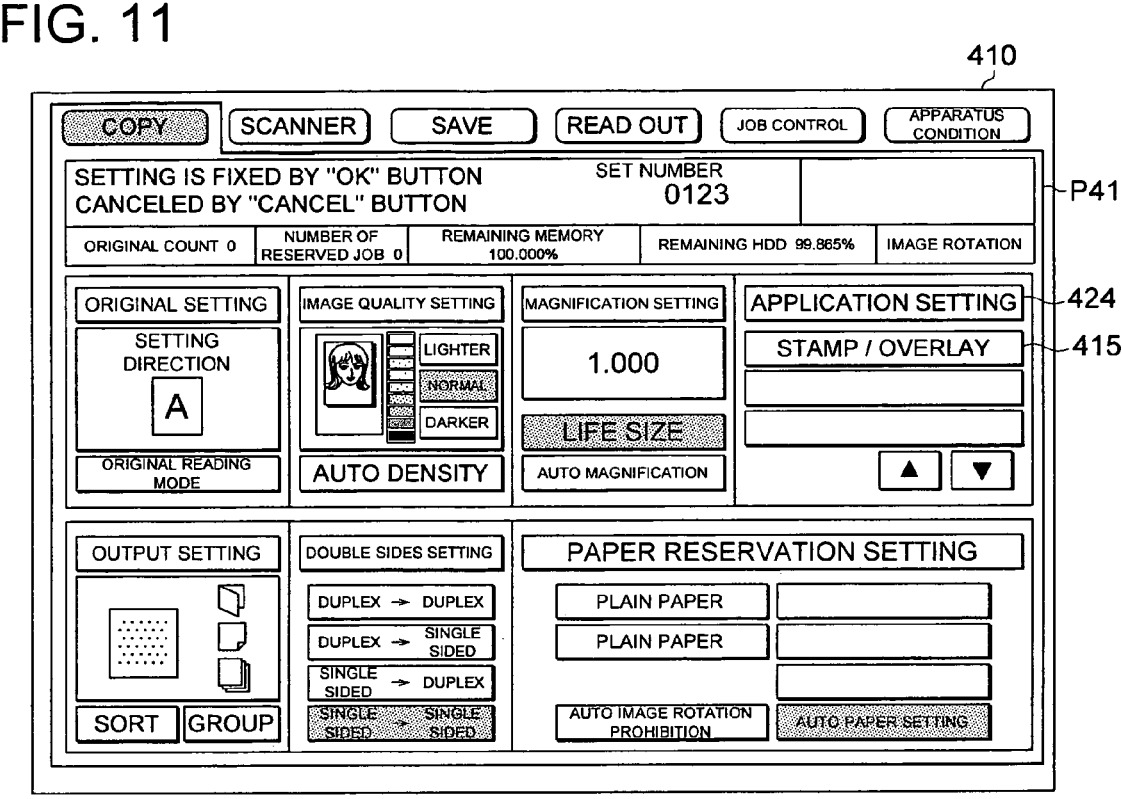
FIG. 11 is the fifth drawing for illustrating a screen transition of a main operation screen and a remote operation screen.

The main operation screen 200 and the remote operation screen 400 are sequentially updated in the order of FIG. 8(*a*), FIG. 8(*b*), FIG. 9(*a*), FIG. 9(*b*), FIG. 10(*a*), FIG. 10(*b*) and FIG. 11, by reading out the operation information in the script data 176 and executing the processing operation based on the operation information. Then the series of the setting operation of the stamp/overlay operation, which has been executed by the user, can be reproduced and a stamp "copy is strictly prohibited" is formed and outputted together with copied images.

As described above, according to the embodiments of the present invention, the operation, which a user has conducted on the remote terminal 300, is sequentially recorded into the script data 176 of the copier 100 as operation information. Then, after recording the operation, the processing operation can be conducted based on the operation information by sequentially reading out the operation information in the script data 176. By doing this way, for example, when a user needs to conduct setting the same operation after the user has conducted complicated operation, user simply may conduct simple operation being reading out the script data 176 and executing the script data. Consequently, it becomes possible to reproduce a series of operation, which a user actually conducts when remotely operating the copier 100 from the remote terminal 300 and improve the operability of the copier 100.

[Examples of the Variation]

The embodiment described above is explained by applying the present invention to the remote control operation systems 1. The embodiment is not limited to the remote operation system 1 but the embodiment can appropriately be modified as described below.

The data structure of the script data 176 is not limited to the data structure shown in FIG. 4, it may be the data structure as shown in FIGS. 12(*a*) and 12(*b*). FIG. 12(*a*) illustrates a script data 176*a* which records only the operation information showing the user operation in the script recording processing. By adopting this data structure, it is possible to decrease the number of read-out operation of the operation information in the script reproduction processing.

It is possible to allow user to edit the script data 176. It is also possible to record the control information for executing repeat processing and blanch processing. FIG. 12(*b*) illustrates script data 176*b* in which control information 189-194 is added and edited. Control information 191 indicates that if the panel number of the most upper layer of the panel is "0x1001", the program proceeds to "Label A" of control information, and if it is not "0x1001, then the program proceeds to "Label B" of control information 189. Control information 194 indicates that the program repeats a series of processing operation according to the operation information and control information stored in the script data 176*b*.

The controller 110 executes process based on the control information in the program-event process in the step T7 of the script reproduction processing. Namely, after setting the stamp/overlay (operation information 180-191) by using the script data 176*b* as described in the embodiment described above, if the panel number is "0x1001", the controller 110 repeats the loop after executing the same processing operation as the processing operation executed when the coordinate data (140, 211) of the main operation screen 200 is touched and the start key is pushed down. However, if the panel number is not "0x1001, then the controller 110 executes setting of the stamp/overlay again. By including the control information into the script data 176*b* as described above, it becomes possible to repeat the same series of operation. For example, it becomes possible to automate the reproduction test of the problems associated with the copier 100.

It also allows controller 110 to control the hardware oriented machine operation of the copier 100. For example, by recording the operation information of "Sub Power OFF", the sub-power source of the copier 100 may be turned off.

Also, by appropriately record the control information of "Reset Panel", it becomes possible to surely reset the copier 100 every time when starting the script reproduction processing and to forcefully release the display of service call. For example, when the service call screen is displayed on the coordinate specified in the argument of "PushPanel", since the button is not displayed at the point of the coordinate, it causes an error. However, by recording the control information for resetting the copier 100 into the script data 176 when service call is detected, it becomes possible to avoid the occurrence of the error.

It is also possible to record the control information for obtaining the operation condition of the copier 100. For example, it is possible to forcefully stop the script reproduction processing by obtaining the operation condition that paper jam occurred with the copier 100. By using this way, it is possible to provide the conditional setting corresponding to the operation condition of the copier 100 in the reproduction of the script data 176.

In the embodiment described above, the copier 100 is supposed to record the script data 176. However, the storage section 350 of the remote terminal 300 may record the script data 176 based on the user operation. In this case, the remote terminal 300 transmits the script data 176 to the controller 110 of the copier 100 for executing the script reproduction processing.

It is also possible to transmit the script data 176 recorded in the remote terminal 300 to other copier 100. In this case, the other copier 100 executes the script reproduction processing and reproduces the script data 176. However, when the operation information for specifying the function which a copier does not have is included in the script data 176, such as when the operation information for executing staple operation is transmitted to a copier having no staple function, the copier is arranged to skip to the next read operation of the operation information or to execute alternative process (for example, sort processing).

The remote terminal 300 may record the script data 176 therein and at the same time execute the script reproducing process. In this case, since the script reproducing process does not have inference on the copier 100, it becomes possible to improve the accuracy of the reproduction test when the copier 100 goes abnormal. It is also possible to trace and reproduce the aspect of the screen at the time when the operation was conducted by recoding the remote operation screen data 174 associated with the operation information into the storage section 350.

It is also possible to provide a pause button for temporally stop the script reproducing process when this button is clicked on the script panel 450. By adopting this way, a user can check the series of operations while temporarily pausing the process. It is also possible to reversibly reproduce the script data 176 by sequentially reading out the operation information from the end of the operation information of the script data 176 and executing the processing operation based on the operation information.

In this embodiment, the operation information specified by the coordinate of the point where the user clicked is recorded into the script data 176. However, the operation information specified by the button (for example, "Push Button 5") where the user clicked may be recorded. The recording method is not limited to the example shown in the embodiment described above.

The remote operation system 1 is not limited to the one described in the embodiment described above. For example, the remote operation system 1 may be a system including a plurality of remote terminals 300. In this case, the copier 100 has capability for recording plural script data 176 operated and set by the plurality of remote terminals 300. By adopting this way, it becomes possible to reproduce the operation executed by a remote terminal in the other remote terminals.

The remote operation system 1 may be a system configuration having one remote terminal 300 and a plurality of copiers 100 connected through a network. In this case, it is possible to deliver the script data 176 operated and set on a remote terminal 300 to the plurality of the copiers 100.

It is also possible to realize an image forming system of the present invention by recording and reproducing the script data 176 of the operation conducted by a user on the operation section 120 of the copier 100 into the storage section 170 of the copier 100. In this case, the script data 176 can be recorded into the storage section 170 by detecting the user event that the operation section 120 of the copier 100 has been operated in the step S3 of the script recording processing illustrated in FIG. 5.

What is claimed is:

1. An image forming system comprising an image forming apparatus and a terminal, which is capable of communicating with the image forming apparatus, for remotely operating the image forming apparatus,
wherein the terminal comprises:
a display controller which controls to display on a display section of the terminal a remote operation screen including a same content as a content of a main operation screen;
an operation input section for inputting according to the remote operation screen; and
a transmission section which transmits operation information including an operation position coordinate on the remote operation screen to the image forming apparatus, and
wherein the image forming apparatus comprises:
a display section to display the main operation screen;
a storage section which receives the operation information including the operation position coordinate on the remote operation screen sent from the terminal, and which stores information of a series of time-series operations conducted by an operator on the terminal as operation procedure information; and
a controller which reads out and reproduces the operation procedure information, and which conducts various settings of the image forming apparatus based on the reproduced series of time-series operations.

2. The image forming system of claim 1, wherein the operation procedure information comprises script data described with a script language, and the controller reproduces the series of timeseries operations by executing a script of the operation procedure information.

3. The image forming system of claim 2, wherein the display controller controls to display, on a partial area of the remote operation screen, a script display screen to display a content of the script data.

4. The image forming system of claim 2, wherein the display controller controls to display, on a partial area of the remote operation screen, an instruction button to instruct execution of the script of the operation procedure information.

5. The image forming system of claim 2, wherein the display controller controls to display, on a partial area of the remote operation screen, an instruction button to instruct storage of the script of the operation procedure information.

6. The image forming system of claim 1, wherein the operation information to be sent to the image forming apparatus comprises a panel number of a hierarchical panel on the remote operation screen in addition to the operation position coordinate.

7. An image forming system comprising an image forming apparatus and a terminal, which is capable of communicating with the image forming apparatus, for remotely operating the image forming apparatus,
wherein the terminal comprises:
a display controller which controls to display on a display section of the terminal a remote operation screen including a same content as a content of a main operation screen;
an operation input section for inputting according to the remote operation screen;
a storage section to store information of a series of timeseries operations conducted by an operator on the terminal, including an operation position coordinate on the remote operation screen, as operation procedure information; and
a transmission section which transmits the operation procedure information stored in the storage section to the image forming apparatus, and
wherein the image forming apparatus comprises:
a display section to display the main operation screen; and
a controller which reproduces the operation procedure information received from the terminal, and which conducts various settings of the image forming apparatus based on the reproduced series of timeseries operations.

8. The image forming system of claim 7, wherein the operation procedure information comprises script data described with a script language, and the controller reproduces the series of timeseries operations by executing a script of the operation procedure information.

9. The image forming system of claim 8, wherein the display controller controls to display, on a partial area of the remote operation screen, a script display screen to display a content of the script data.

10. The image forming system of claim 8, wherein the display controller controls to display, on a partial area of the remote operation screen, an instruction button to instruct execution of the script of the operation procedure information.

11. The image forming system of claim 8, wherein the display controller controls to display, on a partial area of the remote operation screen, an instruction button to instruct storage of the script of the operation procedure information.

12. The image forming system of claim 7, wherein the operation procedure information to be sent to the image forming apparatus comprises a panel number of a hierarchical panel on the remote operation screen in addition to the operation position coordinate.

13. An image forming apparatus, which is capable of being remotely operated based on operation information sent from a terminal, the apparatus comprising:

a display section to display a main operation screen;

a transmission section to send remote operation screen data that includes a same content as a content of the main operation screen, and that is for displaying a remote operation screen on a display section of the terminal;

a storage section which receives the operation information including an operation position coordinate on the remote operation screen sent from the terminal, and which stores information of a series of timeseries operations conducted by an operator on the terminal as operation procedure information; and a controller which reads out and reproduces the operation procedure information, and which conducts various settings of the image forming apparatus based on the reproduced series of timeseries operations.

14. The image forming apparatus of claim 13, wherein the operation procedure information comprises script data described with a script language, and the controller reproduces the series of timeseries operations by executing a script of the operation procedure information.

15. The image forming apparatus of claim 13, wherein the operation information to be sent to the image forming apparatus comprises a panel number of a hierarchical panel on the remote operation screen in addition to the operation position coordinate.

* * * * *